Patented May 18, 1954

2,678,938

UNITED STATES PATENT OFFICE 2,678,938

UNSATURATED SILOXANEDIOLS

Kurt C. Frisch and Paul A. Goodwin, Pittsfield, Mass., assignors to General Electric Company, a corporation of New York No Drawing. Application April 9, 1952,
Serial No. 281,472

4 Claims. (Cl. 260—448.2)

This invention is concerned with unsaturated siloxanediols. More particularly, the invention relates to compositions of matter corresponding to the general formula

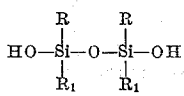

where R is a member selected from the class consisting of aryl and haloaryl radicals, and $R_1$ is an alkylene radical.

Among the values which R may be are, for instance, phenyl, diphenyl, naphthyl, halogenated phenyls including phenyl radicals containing from 1 to 5 halogen atoms, for example, chlorine, fluorine, bromine, etc., chlorobiphenyl (substituted in any one of the positions on either of the rings), etc. Among the values which $R_1$ may be are, for instance, vinyl, allyl, methallyl, propenyl, isopropenyl, butenyl, isobutenyl, etc. Preferably R is a phenyl or chorophenyl radical and $R_1$ is either a vinyl or allyl radical.

The manner whereby the aforementioned composition may be prepared may be varied. One method comprises first effecting reaction between equivalent molar amounts of an organic compound corresponding to the general formula

where R and $R_1$ have the meanings given above and X is halogen, for example, chlorine, bromine, fluorine, etc., for instance, a compound having the formula

and acetic anhydride. The use of small amounts of catalysts, for example, from about 0.1 to 5 per cent, by weight based on the weight of the dihalogenosilane, of an amine such as triethanolamine during the reaction between the organoalkenylhalogenosilane and the acetic anhydride effects catalysis of the reaction so that good yields of the diacetoxysilane are obtained. Thereafter, the mixture is refluxed at the boiling point of the mass until a point where acetyl chloride becomes evident. The acetyl chloride is then removed and the residual liquid vacuum-distilled to give the desired organoalkenyldiacetoxysilane. As will be apparent to those skilled in the art, larger amounts of the acetic anhydride, e. g., from 2 to 4 or more mols of the latter per mol of dihalogenosilane, may be employed in order to cause the reaction to go to completion whereby optimum yields of the organoalkenyldiacetoxysilane may be obtained.

After the organoalkenyldiacetoxysilane is isolated, such product generally being obtained in relatively good yields, in many cases ranging between 90 and 98 per cent of the theoretical yield, the latter is added with stirring to a saturated sodium chloride solution. We may use from 5 to 20 parts of the salt solution per part, by weight, of the diacetoxysilane. The salt solution is preferably a water solution at room temperature or at temperatures below room temperature, for example, temperatures ranging from about −10 to +20° C. By means of this hydrolysis with the saturated salt solution, the water used being in an amount in excess of that required to effect complete hydrolysis of the acetoxy groups to the hydroxy groups, there will be obtained generally a mixture comprising a crystalline precipitate in the water. This precipitate is then filtered and washed several times with cold water maintained at temperatures well below room temperature, for example, about 0 to −20° C. Afterwards the crystalline material may be recrystallized from ligroin or diethyl ether to give the desired hexorganodisiloxanediol.

In order that those skilled in the art may better understand how the present invention may be practiced, the following examples are given by way of illustration and not by way of limitation. All parts are by weight. The unsaturated chlorosilanes employed herein were prepared in accordance with the methods described in the article "Unsaturated Chlorosilanes" by Robert E. Scott and Kurt C. Frisch published in Journal of the American Chemical Society 73, 2599 (1951).

Example 1

About 203 grams (1 mol) of phenyl vinyl dichlorosilane and 204 grams (2 mols) acetic anhydride were placed in a reaction vessel containing a reflux condenser. About 1.0 gram of triethanolamine dissolved in a small amount of acetic anhydride was added to catalyze the reaction. The mixture was refluxed for about 1 hour until the formation of acetyl chloride was detected by means of a thermometer hung inside the condenser. The formed acetyl chloride was then distilled off and the residual liquid vacuum-distilled with heat. There was thus obtained a colorless liquid boiling at around 86–88° C. at 0.2 mm. which was phenyl vinyl diacetoxysilane

Example 2

About 1 part of the phenyl vinyl diacetoxysilane prepared in Example 1 was added with stirring to 10 parts of a saturated aqueous salt solution at room temperature. The mixture was stirred during the addition and afterwards until a crystalline precipitate formed. The precipitate was filtered and washed several times with cold water. The crystalline material was then dissolved in ligroin and the latter cooled below room temperature to give large amounts of a crystalline material in the form of colorless needles. This material was identified as bis-(phenylvinyl) disiloxanediol having the formula

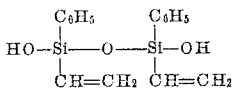

The crystalline needles melted at 107° C. This composition was analyzed for silicon and found to contain 17.68 per cent silicon as compared to the theoretical value of 17.83 per cent silicon. A molecular weight analysis conducted on the material showed it to be of the order of about 316 as compared to the theoretical value of 314.

Example 3

In this example p-chlorophenylvinyldiacetoxysilane was prepared from p-chlorophenylvinyldichlorosilane in the same manner as described for the preparation of phenylvinyldiacetoxysilane in Example 1 with the exception that p-chlorophenylvinyldichlorosilane was employed in place of the phenylvinyldichlorosilane disclosed in Example 1. The p-chlorophenylvinyldiacetoxysilane thus obtained was a colorless liquid distilling at around 132° C. at 0.4 mm. pressure. This diacetoxysilane was hydrolyzed in the same manner as employed for the hydrolysis of phenylvinyldiacetoxysilane using the identical procedure described in Example 2. There was thus obtained the compound bis-(p-chlorophenylvinyl) disiloxanediol having the formula

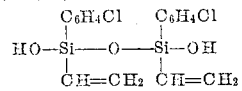

This material consisted of colorless needles having a melting point of about 121–122° C. Analysis for silicon showed it to contain 14.18 per cent silicon as compared to the theoretical value of 14.62 per cent. Analysis for molecular weight showed it to be approximately 381 as compared to the theoretical value of 383.

Example 4

Allylphenyldichlorosilane prepared in the manner described in the aforementioned Scott and Frisch publication was converted to allylphenyldiacetoxysilane using the procedure described for the preparation of phenylvinyldiacetoxysilane in Example 1, with the exception that allylphenyldichlorosilane was employed in place of the phenylvinyldichlorosilane disclosed in Example 1. The allylphenyldiacetoxysilane obtained in this reaction was a colorless liquid boiling at about 134° C. at 1.3 mm. pressure. This diacetoxysilane was hydrolyzed similarly as was done in connection with the hydrolysis of phenylvinyldiacetoxysilane using the identical procedure described in Example 2. There was thus obtained the compound bis-(allylphenyl) disiloxanediol having the formula

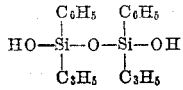

which consisted of colorless needles. The identity of this material was established by analysis for silicon which showed the compound to contain 16.1 per cent silicon (theoretical 16.4 per cent). Analysis showed this material to have a molecular weight of 342 (theoretical molecular weight 343).

It will, of course, be apparent to those skilled in the art that instead of employing the diacetoxysilane disclosed above, other aryl and halogenated aryl alkenyl diacetoxysilanes may be employed to prepare the unsaturated disiloxanediols corresponding to Formula I. Among such compounds which may be prepared in accordance with this method are, for instance, bis-(fluorophenyl allyl) disiloxanediol, diphenyl dibutenyl disiloxanediol, di-(biphenyl) divinyl disiloxanediol, dinaphthyl diallyl disiloxanediol, di-(fluorobiphenyl) divinyl disiloxanediol, bis-(para-chlorophenyl allyl) disiloxanediol, etc. In each of the immediately preceding compounds, the diacetoxysilane employed in preparing these materials are derived from the corresponding dihalogenosilane, for example, the corresponding diorganodichlorosilane in the same manner as that described in Example 1.

The compositions disclosed and claimed in the present invention are useful as intermediates in the preparation of other materials and as polymerizable compositions which can be used in various casting, molding and laminating applications wherein advantage can be taken of the fact that these materials are solids at room temperatures so that they can be deposited from solution on various fillers and stored indefinitely up to the time when use thereof is desired. In addition, the compositions herein described may be copolymerized with other copolymerizable materials, for example, styrene, vinyl acetate, acrylonitrile, methyl methacrylate, to form useful copolymers which are suitable in such applications as castings, various molding applications, and in the laminating field. After polymerization or copolymerization of the herein described compositions, preferably using vinyl polymerization catalysts such as benzoyl peroxide, advantage can be taken of the presence of silicon-bonded hydroxyl groups wherein dehydrating agents can be used to intercondense individual molecules to form siloxane linkages. Alternatively, the herein described materials can be used as intermediates in the preparation of other compositions of matter as, for example, they can be used as reactants for such materials as silicochloroform wherein substitution of the alkenyl groups can be effected to incorporate an additional trichlorosilyl grouping. Furthermore, the silicon-bonded hydroxy groups can be reacted with other compositions to substitute other groupings thereon.

What we claim as new and desire to secure by Letters Patent of the United States is:

1. The method which comprises hydrolyzing at a temperature from −10° to +20° C. a compound having the formula $RR_1Si(OCOCH_3)_2$ with water in excess of that necessary to effect complete hydrolysis of the acetoxy groups to give a compound having the formula

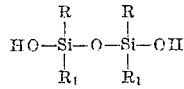

where R is a member selected from the class consisting of aryl and haloaryl radicals, and $R_1$ is an alkenyl radical, the water of hydrolysis being present in the form of a saturated sodium chloride solution and the latter solution comprising, by weight, from 5 to 20 parts thereof per part of the above-mentioned diorganodiacetoxysilane, and thereafter isolating the above-described dialkenyldisiloxanediol.

2. The method which comprises hydrolyzing at a temperature from −10° to +20° C. phenyl vinyldiacetoxysilane with water in excess of that necessary to effect complete hydrolysis of the acetoxy groups to give bis-(phenyl vinyl) disiloxanediol-1,3, the said water of hydrolysis being present in the form of a saturated sodium chloride solution and the latter solution comprising, by weight, from 5 to 20 parts thereof per part of the phenyl vinyldiacetoxysilane, and thereafter isolating the above-mentioned disiloxanediol.

3. The method which comprises hydrolyzing at a temperature from −10° to +20° C. para-chlorophenyl vinyldiacetoxysilane with water in excess of that necessary to effect complete hydrolysis of the acetoxy groups to give bis-(para-chlorophenyl vinyl) disiloxanediol-1,3, the said water of hydrolysis being present in the form of a saturated sodium chloride solution and the latter solution comprising, by weight, from 5 to 20 parts thereof per part of the parachlorophenyl vinyldiacetoxysilane, and thereafter isolating the above-mentioned disiloxanediol.

4. The method which comprises hydrolyzing at a temperature from −10° to +20° C. phenyl allyldiacetoxysilane with water in excess of that necessary to effect complete hydrolysis of the acetoxy groups to give bis-(phenyl allyl) disiloxanediol-1,3, the said water of hydrolysis being present in the form of a saturated sodium chloride solution and the latter solution comprising, by weight, from 5 to 20 parts thereof per part of the phenyl allyldiacetatoxysilane, and thereafter isolating the above-mentioned disiloxanediol.

References Cited in the file of this patent

UNITED STATES PATENTS

| Number | Name | Date |
| --- | --- | --- |
| 2,426,912 | Wright | Sept. 2, 1947 |
| 2,441,098 | Hyde | May 4, 1948 |
| 2,530,635 | Sowa | Nov. 21, 1950 |
| 2,537,073 | MacKenzie | Jan. 9, 1951 |
| 2,595,730 | Swiss | May 6, 1952 |
| 2,600,307 | Lucas | June 10, 1952 |

OTHER REFERENCES

Kipping et al., "Jour. Chem. Soc." (London) (1912), vol. 101, pages 2156–2166.

Rochow, "Chemistry of the Silicones," page 51, Wiley and Sons, Publishers, N. Y. (1946).